UNITED STATES PATENT OFFICE.

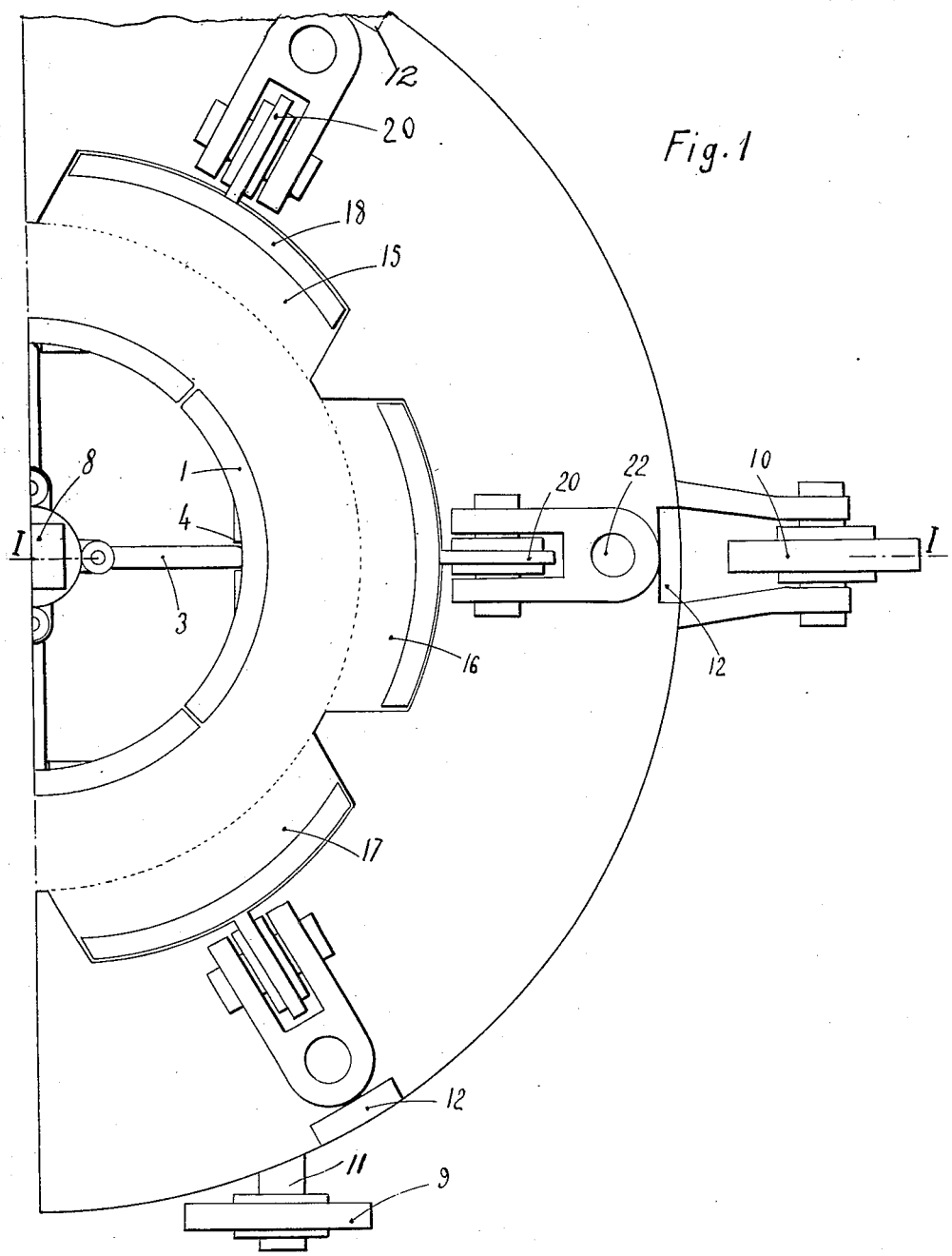

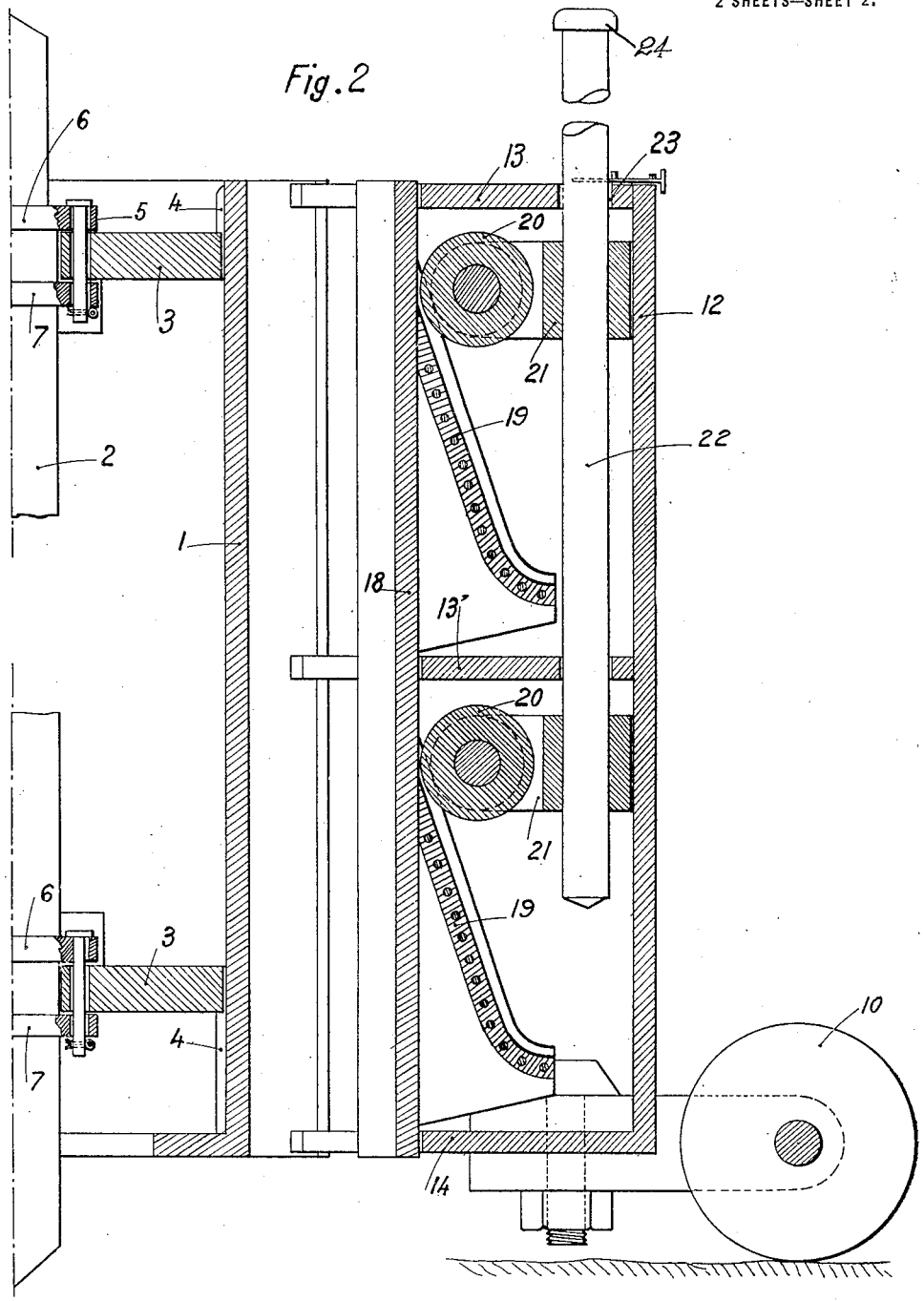

ANTOINE PORRI, OF BONE, ALGERIA.

MOLD FOR MANUFACTURE OF CONCRETE PIPES.

1,336,857.   Specification of Letters Patent.   Patented Apr. 13, 1920.

Application filed January 6, 1919. Serial No. 269,845.

*To all whom it may concern:*

Be it known that I, ANTOINE PORRI, citizen of the French Republic, residing at Bone, Department of Constantine, Algeria, have invented certain new and useful Improvements in Molds for Manufacture of Concrete Pipes; and I do hereby declare the following to be a full, clear, and exact description of the invention, such as will enable others skilled in the art to which it appertains to make and use the same.

This invention relates to the manufacture of concrete pipes and has for its object to provide an apparatus whereby concrete can be mechanically compressed for the purpose of manufacturing pipes in very large quantities, and whereby it is possible to produce pipes of any diameter by merely modifying certain cylindrical metallic plate elements. Furthermore, the apparatus presents all the conditions necessary for satisfactory working, inasmuch as it does not interfere with the armature of the pipe during the compression of the concrete, which compression is much more powerful than that produced by manual labor, while a much greater resistance is obtainable.

It consists essentially of an inner mold formed by a pluralty of vertically arranged segmental supports assembled to form a hollow disjointable cylinder. Such supports may be fixed by means of horizontal rods on to a vertical shaft or pivot arranged along the axis of the apparatus. By the use of a lever key the interior mold can be easily taken to pieces. The outer mold, which has the same axis as the inner mold and is also disjointable, consists of vertical segmental supports capable of being simultaneously displaced with little friction within the vertical side pieces of the outside within the apparatus, so as to reduce the thickness of the annular part which forms the wall of the pipe to be manufactured. By using a hydraulic or other suitable press mounted on rails on the extremities of rods projecting at the top of the mold, a displacement toward the center, which thus compresses the concrete, is imparted to the supports with the aid of a system for transmitting the requisite motion.

I will describe with reference to the accompanying drawing, a construction in accordance with the present invention but I do not limit myself to the precise construction described and illustrated.

Figure 1 is a transversal semi-section of the apparatus.

Fig. 2 is a vertical section along the line 1—1 of Fig. 1.

Referring to the drawing the inner mold made of steel plate, consists of a series of vertical curved supports 1, the section of which represents thin circular segments. The supports are placed side by side, to form a hollow cylinder within which is a shaft 2 carrying pivoted horizontal rods 3 capable of entering recesses 4 provided on the central and interior part of the supports 1, so that the supports can be assembled in such manner as to form a fixed cylinder which constitutes the internal mold of the pipe. The various arms 3 are joined to the shaft 2 by pivot pins 5 inserted between the plates 6 and 7 forming part of the shaft 2. The upper part of the shaft 2 is square, as shown at 8, and may be held by a key when it is desired to take the inner mold to pieces. It suffices, for that purpose, to cause the shaft 2 to pivot upon itself, while the rods 3 rotate around the pivot pins 5, the extremities engaged in the recesses 4 remain fixed, and the whole system of arms and pivots and the central shaft can be raised in one block from the top and the supports 1 withdrawn. The exterior mold consists of two identical and distinct parts, resting upon three small rollers 9, 10 and 11, which are jointed together, either by means of hooks, or by hinged nuts, or any other suitable means so as to form a hollow cylinder having the same axis as the cylinder which forms the inner mold. Each of the parts of the exterior mold consists of cylindrical plates 12, provided with two end covers or plates forming semi-hoops 13 and 14, and with several intermediate semi-hoops $13^1$, having recessed portions 15, 16 and 17. The semi-hoops are jointed together by the plates 12, and by vertical stems which connect the projecting parts which separate the recessed portions 15, 16 and 17. In the recessed portions are introduced the supports 18 of the exterior mold. These supports are provided with inclined parts 19 or guides, on which bear guide rollers 20 mounted in forks 21 fixed on to the vertical rods 22, which pass through holes 23 in the outer cover 13. The upper part of the rods 22 is enlarged as shown at 24, so that it may rest against a plate actuated by the ram of a press. By causing a press to act on the extremities of said rods, the guide rollers 20, which rest on the guide rails 19 are driven downwardly and cause the supports 18 to advance radially. The manufacture of pipes by means of the apparatus hereinbefore described is carried out as follows:—

In the first place the interior mold is placed in position by fixing the assembled supports 1 by means of the horizontal rods 3 of the central pivot and of the lever key. The inner mold is then inclosed by the two parts which form the outer mold and which are fastened together. The armature, previously prepared, is fixed and the annular part filled with concrete as dry as possible. A circular plate is then placed in position so as to rest on the rods 24 and the necessary pressure is exerted on the plate by means of a hydraulic press mounted upon rails. The supports 18, of the exterior mold advance radially under the influence of the pressure imparted by the guide rollers acting on the inclined guides and the pressure is thus exerted until the supports 18 reach the position shown by the dotted lines in Fig. 1. The pressure is then stopped and the lifting is proceeded with by operating first by means of a lever key on the squared part 8 of the shaft 2, the effect of which is to permit the removal of the interior mold. The connecting hooks of the interior mold are then released. The above apparatus permits the construction of cylindrical or semi-cylindrical pipes and the pipes of trussed or reinforced concrete so manufactured yield a maximum of resistance because the armature is not subject to any disturbance during the compression as is the case when the concrete is manually compressed, and furthermore because the cement concrete becomes more resistant the more it is compressed.

I claim:

1. Apparatus for making concrete or reinforced concrete pipes comprising an inner mold and an outer mold, said inner mold consisting of a plurality of independent plates, means for supporting the plates in their operative positions, said means being operable to collapse the plates, the outer mold comprising a plurality of supporting plates and means for forcing the latter toward the plates of the inner mold.

2. Apparatus for making concrete or reinforced concrete pipes comprising an inner mold and an outer mold, said inner mold consisting of a plurality of plates, rotatable means for controlling the positions of said plates, said outer mold consisting of a plurality of plates and cam means for moving said plates of the outer mold toward the plates of the inner mold.

3. Apparatus for making concrete or reinforced concrete pipes comprising an inner mold and an outer mold, said inner mold consisting of a plurality of plates permanently secured together and collapsible, said outer mold comprising a plurality of plates movable toward the plates of the inner mold and means for permanently carrying the plates of the outer mold.

In testimony whereof I affix my signature.

ANTOINE PORRI.